US012592832B2

(12) United States Patent
    Reinholdtsen

(10) Patent No.:  US 12,592,832 B2
(45) Date of Patent:  Mar. 31, 2026

(54) EMBEDDING CRYPTOGRAPHICALLY SIGNED DATA IN UNIFORM RESOURCE NAMES OF A NETWORK PROTOCOL

(71) Applicant: Bitsy Services LLC, Woodinville, WA (US)

(72) Inventor: Paul Reinholdtsen, Woodinville, WA (US)

(73) Assignee: BITSY SERVICES LLC, Woodinville, WA (US)

( * ) Notice: Subject to any disclaimer, the term of this patent is extended or adjusted under 35 U.S.C. 154(b) by 187 days.

(21) Appl. No.: 18/529,712

(22) Filed: Dec. 5, 2023

(65) Prior Publication Data

US 2025/0184150 A1    Jun. 5, 2025

(51) Int. Cl.
    *H04L 9/40*         (2022.01)
    *G06F 21/64*        (2013.01)
    *H04L 9/32*         (2006.01)

(52) U.S. Cl.
    CPC ............ *H04L 9/3247* (2013.01); *G06F 21/64* (2013.01); *H04L 63/126* (2013.01); *H04L 63/168* (2013.01)

(58) Field of Classification Search
    CPC ... H04L 9/3247; H04L 63/126; H04L 63/168; G06F 21/64
    See application file for complete search history.

(56) References Cited

U.S. PATENT DOCUMENTS

| | | | | |
|---|---|---|---|---|
| 10,853,780 | B1 * | 12/2020 | Sirota | .................... G06Q 10/06 |
| 11,695,568 | B1 * | 7/2023 | Kempf | .................. H04L 9/3242 |
| | | | | 713/176 |
| 2003/0140225 | A1 * | 7/2003 | Banks | .................... G06Q 20/02 |
| | | | | 713/155 |
| 2014/0052706 | A1 * | 2/2014 | Misra | .................. G06F 16/1837 |
| | | | | 707/698 |
| 2018/0124056 | A1 * | 5/2018 | Roth | .................... H04L 63/0428 |
| 2019/0319939 | A1 * | 10/2019 | Hamel | .................... G06F 21/33 |
| 2023/0129705 | A1 * | 4/2023 | Wiklof | ................ G06F 21/6245 |
| | | | | 726/26 |
| 2023/0232222 | A1 * | 7/2023 | Ohashi | .................... G06F 21/64 |
| | | | | 455/411 |

* cited by examiner

*Primary Examiner* — David J Pearson
(74) *Attorney, Agent, or Firm* — Shook, Hardy & Bacon L.L.P.

(57) ABSTRACT

Methods and systems are provided for embedding cryptographically signed data in URNs of a network protocol. In embodiments described herein, uniform resource name (URN) for a request is generated through a network protocol where the URN includes a public key and a representation of the request. A signature is computed using a public-key signature algorithm based on the URN and/or any content data associated with the request using a private key associated with the public key. A signed URN is generated including the URN and the signature. The signed URN is then stored along with any content data associated with the request.

18 Claims, 7 Drawing Sheets

400

GENERATING A URN FOR A REQUEST THROUGH A PROTOCOL, THE URN INCLUDING A PUBLIC KEY   ~402

COMPUTING, THROUGH A PUBLIC-KEY SIGNATURE ALGORITHM, A SIGNATURE BASED ON THE URN USING A PRIVATE KEY ASSOCIATED WITH THE PUBLIC KEY   ~404

GENERATING A SIGNED URN FROM THE URN AND THE SIGNATURE   ~406

STORING THE SIGNED URN IN A SERVER   ~408

400

GENERATING A URN FOR A REQUEST THROUGH A PROTOCOL, THE URN INCLUDING A PUBLIC KEY ～402

COMPUTING, THROUGH A PUBLIC-KEY SIGNATURE ALGORITHM, A SIGNATURE BASED ON THE URN USING A PRIVATE KEY ASSOCIATED WITH THE PUBLIC KEY ～404

GENERATING A SIGNED URN FROM THE URN AND THE SIGNATURE ～406

STORING THE SIGNED URN IN A SERVER ～408

500

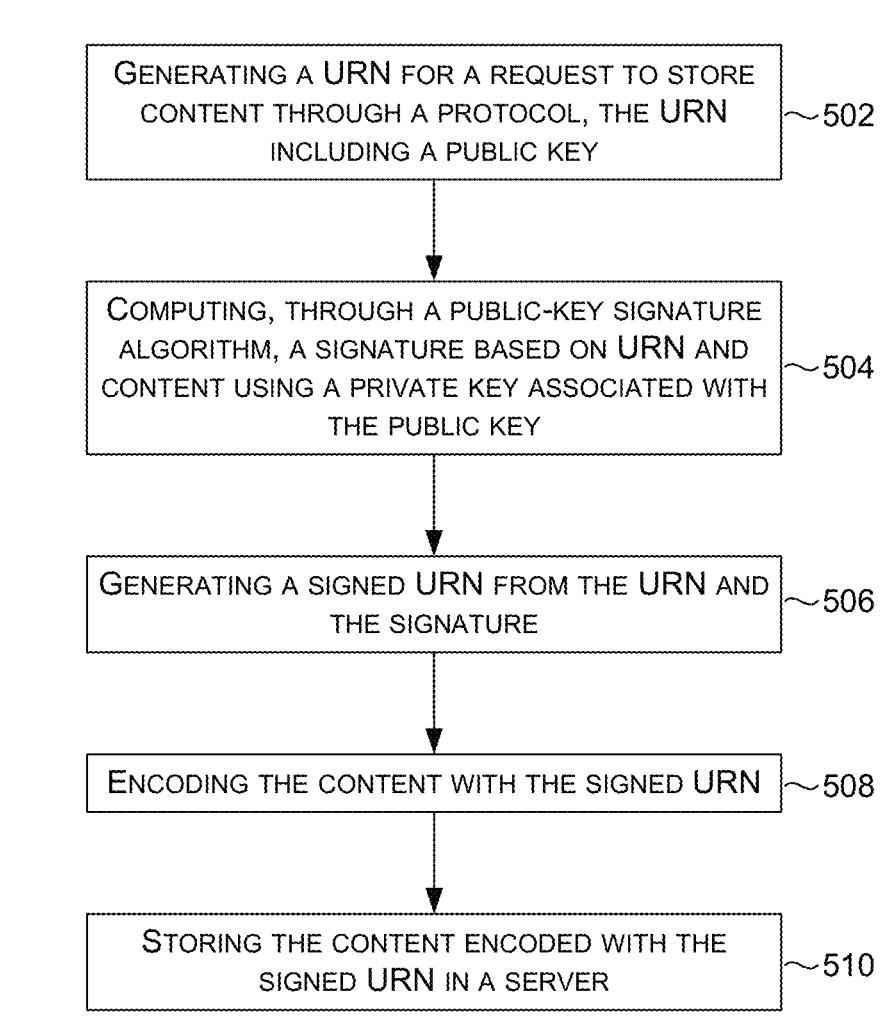

GENERATING A URN FOR A REQUEST TO STORE CONTENT THROUGH A PROTOCOL, THE URN INCLUDING A PUBLIC KEY    ~502

COMPUTING, THROUGH A PUBLIC-KEY SIGNATURE ALGORITHM, A SIGNATURE BASED ON URN AND CONTENT USING A PRIVATE KEY ASSOCIATED WITH THE PUBLIC KEY    ~504

GENERATING A SIGNED URN FROM THE URN AND THE SIGNATURE    ~506

ENCODING THE CONTENT WITH THE SIGNED URN    ~508

STORING THE CONTENT ENCODED WITH THE SIGNED URN IN A SERVER    ~510

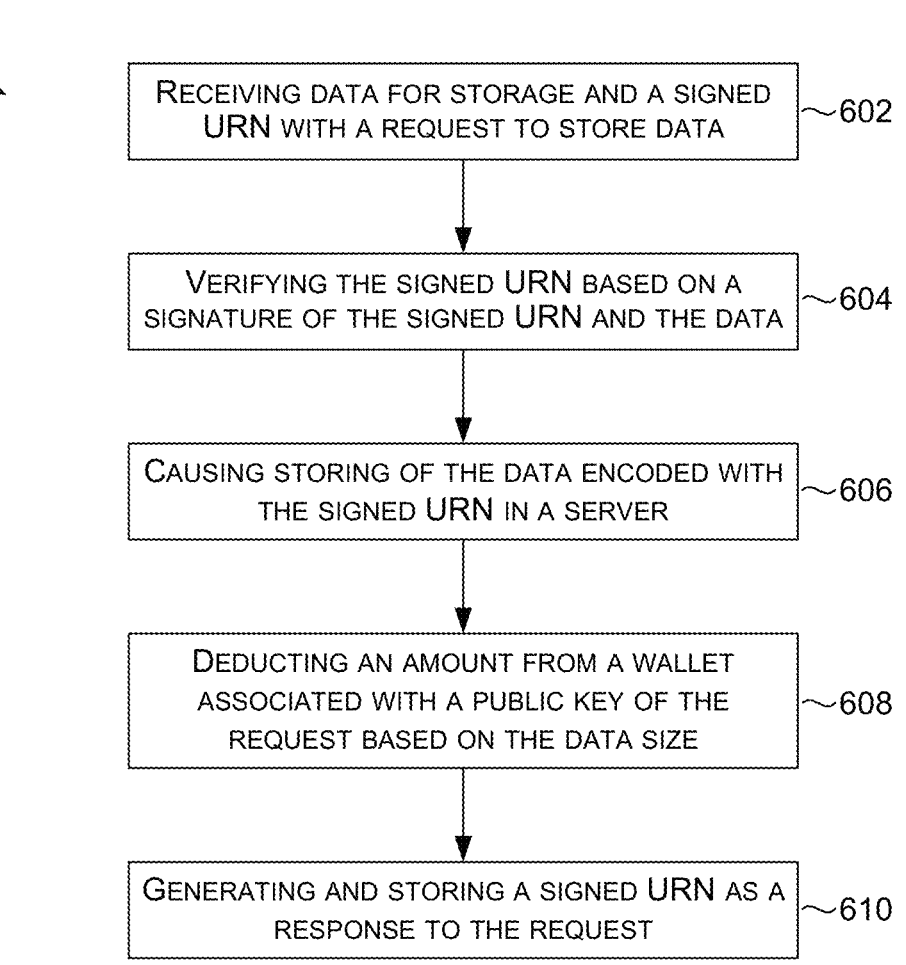

RECEIVING DATA FOR STORAGE AND A SIGNED
URN WITH A REQUEST TO STORE DATA        ~602

VERIFYING THE SIGNED URN BASED ON A
SIGNATURE OF THE SIGNED URN AND THE DATA        ~604

CAUSING STORING OF THE DATA ENCODED WITH
THE SIGNED URN IN A SERVER        ~606

DEDUCTING AN AMOUNT FROM A WALLET
ASSOCIATED WITH A PUBLIC KEY OF THE
REQUEST BASED ON THE DATA SIZE        ~608

GENERATING AND STORING A SIGNED URN AS A
RESPONSE TO THE REQUEST        ~610

FIG. 6

EMBEDDING CRYPTOGRAPHICALLY SIGNED DATA IN UNIFORM RESOURCE NAMES OF A NETWORK PROTOCOL

BACKGROUND

The internet is a global network of interconnected computer networks that enables communication and the exchange of information across the globe. However, there exists many issues with the various protocols utilized for data transmission, storage, and access to the internet (e.g., transmission control protocol/internet protocol (TCP/IP), hypertext transfer protocol (HTTP), etc.) with respect to data provenance, authentication, authorization, interoperability, security, privacy, etc. For example, HTTP does not provide built-in mechanisms for verifying the authenticity of data being transferred and HTTP provides limited visibility regarding the original source of the data being transferred. The issues of tracking data provenance is further exacerbated due to various efficiency enhancements for HTTP, such as caching and proxies.

In this regard, various applications/methods are built on top of, or in addition to, the various protocols to address the issues with the various protocols, such as JavaScript object notation (JSON) web tokens (JWTs), basic access authentication (basic auth), blockchain for cryptocurrencies or content, etc. However, each of the applications/methods introduce additional complexities due to lack of standardization and interoperability, security vulnerabilities, privacy concerns, user adoption and complexity, legal recognition and regulatory inconsistencies, cryptographic key management, scalability and performance, data authenticity and verifiability, long-term validity and accessibility, market volatility, environmental impact, etc.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, embedding cryptographically signed data in uniform resource names (URNs). In this regard, embodiments described herein facilitate embedding cryptographically signed data in URNs of a network protocol by generating a URN for a request or a response through a network protocol with metadata corresponding to the request or response embedded into the URN (e.g., the type of request or response, a public key of the user or server communicating the request or response, expiration of the request or response, other signed URNS embedded into the URN, etc.). A signature is then cryptographically computed based on the URN with embedded metadata and, in some embodiments, also based on the content of the request or response (e.g., such as request to store content, such as images, video, documents, software/applications, databases, scripts/code, etc.). A signed URN is generated by encoding or appending the URN with the signature. The signed URN and/or content of the request or response is then communicated, verified, processed, and/or stored based on the type of request or response embedded within the signed URN.

BRIEF DESCRIPTION OF THE DRAWINGS

FIG. 5 is a process flow showing a method for embedding cryptographically signed data in URNs of a network protocol based on a pairing of the URN with content, in accordance with embodiments of the present disclosure.

FIG. 6 is a process flow showing a method for receiving cryptographically signed data embedded in URNs of a network protocol, in accordance with embodiments of the present disclosure.

DETAILED DESCRIPTION

Figure 1:
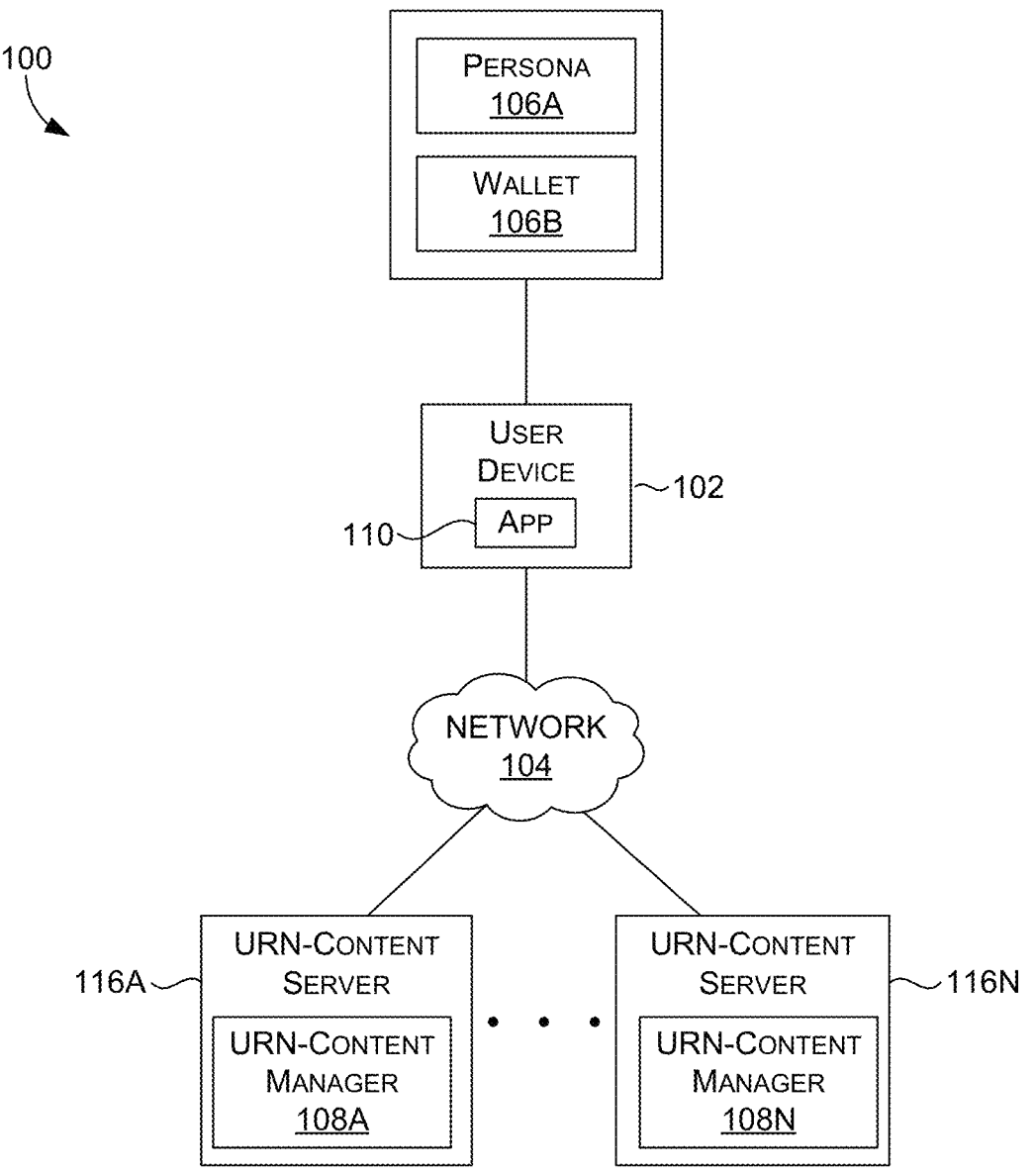
FIG. 1 depicts a diagram of an environment in which one or more embodiments of the present disclosure can be practiced, in accordance with various embodiments of the present disclosure.

The internet is a global network of interconnected computer networks that enables communication and the exchange of information across the globe. However, there exists many issues with the various protocols utilized for data transmission, storage, and access to the internet (e.g., transmission control protocol/internet protocol (TCP/IP), hypertext transfer protocol (HTTP), etc.) with respect to data provenance, authentication, authorization, interoperability, security, privacy, etc. For example, HTTP does not provide built-in mechanisms for verifying the authenticity of data being transferred and HTTP provides limited visibility regarding the original source of the data being transferred. The issues of tracking data provenance is further exacerbated due to various efficiency enhancements for HTTP, such as caching and the use of proxies.

In this regard, various applications/methods are built on top of, or in addition to, the various protocols to address the issues with the various protocols, such as JavaScript object notation (JSON) web tokens (JWTs), basic access authentication (basic auth), blockchain, etc. However, each of the applications/methods introduce additional complexities due to lack of standardization and interoperability, security vulnerabilities, privacy concerns, user adoption and complexity, legal recognition and regulatory inconsistencies, cryptographic key management, limited scalability and performance, data authenticity and verifiability, long-term validity and accessibility, market volatility, environmental impact, etc.

For example, with respect to the lack of standardization and interoperability, the absence of universally accepted standards and protocols makes it difficult for various solutions to communicate and work together seamlessly, creating inefficiencies and limiting their effectiveness across different systems and platforms. With respect to the limited scalability and performance, some existing solutions struggle to handle the rapidly growing volume of data and transactions, including cryptocurrencies, leading to performance bottlenecks and hindering their adoption in large-scale use cases. Further, as technology evolves rapidly, existing solutions may become outdated or suffer from deprecated cryptographic algorithms, posing challenges for long-term validity, security, and accessibility.

With respect to the complexity and user adoption, the complexity of certain solutions can be a barrier to user adoption, as individuals and organizations may be reluctant to invest in specialized hardware or software or require extensive training to utilize these services effectively. As well, differences in legal and regulatory frameworks across jurisdictions can limit the global acceptance and enforceability of certain solutions, including cryptocurrencies, creating uncertainties for businesses and users. With respect to the high costs, resource consumption and environmental concerns, the implementation and maintenance costs of some existing solutions may be prohibitive for small businesses and individual users, and certain cryptocurrencies have raised concerns about their environmental impact due to high energy consumption. With respect to privacy, some existing solutions, including certain cryptocurrencies, may inadvertently expose sensitive information or compromise user privacy, leading to reluctance in adopting these technologies and potential legal repercussions. With respect to market volatility, cryptocurrencies are known for their high price volatility, which can make them less suitable for certain use cases and lead to significant financial risks for users.

Accordingly, unnecessary computing resources are utilized with respect to various applications/methods implemented for data provenance, authentication, authorization, interoperability, security, privacy, etc. in conventional implementations that are built on-top of the various protocols utilized for data transmission, storage, and access to the internet. For example, computing and network resources are unnecessarily consumed to facilitate verification of data through conventional implementations, such as basic auth, JWTs, etc. With respect to conventional authentication, a centralized server must be called for verification. Each call to the centralized server is computationally expensive for a network, decreases throughput for the network, and increases the network latency. Further, the use of a centralized server decreases security for data and increases privacy concerns for the data as the centralized server can be the target of attacks. With respect to basic auth, servers implementing basic auth can be subject to security vulnerabilities due to attacks against certain passwords of the username-password scheme when the passwords are too simple. In order to protect against attacks on basic auth for a server, additional security measures can be implemented. However, the attacks against the security vulnerability of basic auth and/or the additional security measures can be computationally expensive for the network, decrease the throughput for the network, and increase the network latency. With respect to JWTs, servers implementing JWTs are required to implement JWTs on top of existing protocols for the internet (e.g., HTTP). However, as the JWTs must be implemented on top of the existing protocols, computing and network resources are unnecessarily consumed for the additional JWT that must be sent in addition to the HTTP packets sent over the network, thereby increasing computational costs for the network, decreasing the throughput for the network, and increasing the network latency.

As such, embodiments of the present disclosure are directed to embedding cryptographically signed data in URNs of a network protocol in an efficient and effective manner. In this regard, a network protocol utilizing cryptographically signed data embedded in URNs efficiently and effectively optimizes authentication, data provenance, authentication, authorization, interoperability, security, and privacy of data at the network protocol level.

Generally, and at a high level, embodiments described herein facilitate embedding cryptographically signed data in URNs of a network protocol by generating a URN for a request or a response through a network protocol with metadata corresponding to the request or response embedded into the URN (e.g., the type of request or response, a public key of the user or server communicating the request or response, a path of the request or response, expiration of the request or response, other signed URNS embedded into the URN, etc.). A signature is then cryptographically computed based on the URN with embedded metadata and, in some embodiments, also based on the content of the request or response (e.g., such as request to store content, such as images, video, documents, software/applications, databases, scripts/code, etc.). A signed URN is generated by encoding or appending the URN with the signature. The signed URN and/or content of the request or response is then communicated, verified, processed, and/or stored based on the type of request or response embedded within the signed URN.

In operation, a URN for a request or a response is generated through a network protocol (e.g., a PUT operation, a GET operation, etc.) with metadata corresponding to the request or response embedded into the URN. For example, the metadata embedded into the URN can include the type of request or response, a public key of the user or server communicating the request or response, a path where the data is to be transmitted, stored or accessed, expiration of the request or response, other signed URNs embedded into the URN, etc.

In some embodiments, the URN is a request to store content data (e.g., any type of content, such as images, video, documents, software/applications, databases, scripts/code, such as application programming interfaces, etc.). For example, a user may request to store content in a server. In other embodiments, the URN is a request or response without additional content data. For example, the request can be a request to access data or authenticate the user submitting the request. In some examples, the URN may be a response from a server responding to the request. As another example, the request can be a request to transmit payment.

A signature is cryptographically computed based on the URN with embedded metadata using a private key associated with the public key. In some embodiments, the signature is computed through a public-key signature algorithm, such as public-key signature algorithm based on elliptic curve cryptography (e.g., Edwards-curve Digital Signature Algorithm (EdDSA) signature scheme using SHA-512 and Curve25519 (Ed25519)), hash-based cryptography (e.g., Leighton-Micali Signature (LMS), the eXtended Merkle Signature Scheme (XMSS), etc.), lattice-based cryptography (e.g., NTRUEncrypt), multivariate cryptography (e.g., rainbow), and/or any public-key cryptography algorithm. In embodiments where the request is to store content, the signature is computed based on the URN with embedded metadata and the content being stored using a private key associated with the public key. For example, the content data and/or the URN with embedded metadata may be hashed in order to compute the signature. In other examples, the signature data is computed based on the URN with embedded metadata and the content data without hashing the content data and/or URN with embedded metadata.

A signed URN is generated by encoding or appending the URN with the signature. In embodiments, the signed URN can be generated by encoding the URN and the signature using alphapi notation (e.g., a base-16 encoding using the lowercase letters a through p). In embodiments where the request is to store data, the signed URN can be encoded into the data before the data is stored. In this regard, in embodiments where the request is to store content, the URN with embedded metadata is cryptographically paired with the content through the signature allowing verification that the signed-URN content pair was signed by someone using the private key.

The signed URN and/or content of the request or response is then communicated, verified, processed, and/or stored based on the type of request or response embedded within the signed URN. In embodiments where metadata is included in the URN, the metadata embedded in the URN is cryptographically signed allowing for verification. Further, in embodiments where other signed URNs are embedded into the URN, the pairing of other signed URNs provides a general purpose way to cryptographically link data in multiple ways.

As an example of an embodiment where the request is to store content, assume a user takes a photograph through a camera with a computing device in communication with the camera. The user then submits a request to store the photograph (e.g., image data) in a server through an application (e.g., a trusted client) on the computing device associated with the camera. The computing device associated with the camera generates a URN with the public key associated with the computing device of the camera, a path for the image data (e.g., john/pictures/camera), a file name for the image data, and additional metadata for the type of request of storing the image data. The computing device associated with the camera hashes the image data and computes a signature using an algorithm, such as Ed25519, based on the hashed image data and the URN using a private key associate with the public key of the computing device of the camera. The computing device associated with the camera appends the URN with the signature to create a signed URN. The computing device associated with the camera communicates the signed URN with the image data to the server. The server processes the signed URN, verifies the signed URN and the image data, and stores the signed URN and image data in the server.

As an example of an embodiment where a URN is generated for a response that does not include content data, continuing with the example discussed in the paragraph above, the server generates a URN as a response with a public key associated with the server and additional metadata for the type of response to the request to store the image data. The server computes a signature using an algorithm, such as Ed25519, based on the URN using a private key associated with the public key of the server. The server appends the URN with the signature to create a signed URN. The server stores the signed URN and communicates the signed URN to the computing device associated with the camera as a response to the request to store the image data.

As an example of an embodiment where a URN is generated for a request that does not include content data, a user can submit a request through an application (e.g., a trusted client) to transmit payment from a wallet of the user to a different wallet of a different user through a computing device. The application can generate a URN with a public key of the user, the wallet of the user, the public key of the different user, the wallet of the different user, the amount to be transferred, and metadata corresponding to the request to transfer money. The application computes a signature based on the URN using the private key associated with the public key of the user. The application appends the URN with the signature to create a signed URN. The application communicates the signed URN to a server, which stores, verifies, and processes the transaction. The server then generates, stores and communicates a new signed URN as a response to the request confirming the transaction.

As another example of an embodiment where a URN is generated for a request that does not include content data, the request can be a request to access data or authenticate the user submitting the request. For example, the request can be a basic auth request in order to authenticate through an HTTP request. Embodiments of the network protocol described herein provides a secure format that can be utilized for basic auth. For example, the username is the public key of a signed URN and the password is the remainder of the signed URN (e.g., the signature computed using the private key associated with the public key and any metadata, such as authorization scopes, timestamps, etc., corresponding to the basic auth request stored in the URN). In some embodiments, signed URNs as described herein can be utilized to extend basic auth, which can be utilized as fully backwards compatible with standard basic auth.

In embodiments, the network protocol provides for payments (e.g., micropayments—very small amounts of money) for data storage and/or communication. For example, an amount determined based on the length/size of the data and/or signed URN is deducted from a wallet associated with the public key of the request when communicating a request to store data. In some embodiments, a currency tied to the amount of storage (e.g., price of the currency is tied to a bit of storage) can be utilized. For example, a currency can be defined as the cost of buying one bit of non-redundant permanent random access cloud storage. In this regard, a bit-valued currency improves economic efficiencies by tracking the actual cost of providing a service. In this regard, a bit-valued currency is also less sensitive to fiat currency value fluctuations. Therefore, at large scales, a bit-valued currency can provide a stable, albeit inflationary, currency that is less sensitive to government policies than government sponsored fiat currencies.

Advantageously, efficiencies of computing and network resources can be enhanced using implementations described herein. In particular, the generating of a signed URN where the signature is based on public key and the URN generated for the transmission, accessing, or storage of data results is an efficient use of computing resources as compared to conventional applications/methods built on top of protocols for transmission, accessing, or storage of data over the internet because the enhanced security is built into the network protocol itself, thereby negating the additional data required to be sent over a network by additional applications for enhanced security. Further, the technology described herein results in signed URNs paired with content that enables the verification of the signed URNs paired with content without a need to call a centralized server with the entirety of the signed URN paired with content as the signatures can be verified based on the URN, the private key associated with the public key of the URN used to generate the signature, and the content, thereby reducing the amount of data that must be transmitted over a network and negating the security concerns of requiring a centralized server. Further, the technology described herein enables the increase in security of basic auth, while maintaining the efficiencies of basic auth, as the signed URN can be utilized to increase the security of passwords of basic auth, thereby reducing data being sent over a network in the event of an attack against a server using basic auth and/or implementing additional security measures in addition to basic auth. In this regard, the technology described herein conserves network resources as less data being sent over a computer network while maintaining data security, privacy, provenance, etc., thereby decreasing computational costs for the network, increasing the throughput for the network, and decreasing the network latency.

Various terms are used throughout the description of embodiments provided herein. A brief overview of such terms and phrases is provided here for ease of understanding, but more details of these terms and phrases is provided throughout.

A "URN" is a type of Uniform Resource Identifier (URI) that is used to identify a resource by its name or identifier, rather than by its location or access method. URNs provide a persistent and location-independent means of identifying resources, allowing them to be referenced over time and across different locations on the internet. Unlike URLs (Uniform Resource Locators), which specify how to access a resource, URNs are focused on providing a unique and persistent name for the resource. In this regard, URNs can be utilized to identify a resource regardless of where the resource is stored (e.g., the URN can be located in a distributed server environment as opposed to a specific server.).

A "representation of a request" refers to information or data describing the type of request, the entity submitting the request, and/or any information or data regarding the request. For example, a request to store data can include information or data describing the type of request to be a request to store data, the entity of the request, such as a public key, the file name, metadata, such as geographic location, and/or etc. As another example, a request to access data includes information or data describing the type of request to be a request to access data, the entity of the request, such as a public key, a URL, metadata, such as geographic location, and/or etc. As another example, a request to authenticate the user submitting the request includes information or data describing the type of request to be a request to authenticate the user, the entity of the request, such as a public key, a password, a URL, and/or etc.

A "PUT" operation refers to a method or request type indicating that a client wants to store or replace the resource at a specific URN with the data provided in the request payload. A PUT request is idempotent as multiple identical PUT requests have the same effect as one PUT request.

A "GET" operation refers to a method or request type indicating that a client wants to retrieve a specific resource from a server. The resource is identified by a URN (Uniform Resource Locator) included in the request. The primary purpose of a GET request is to retrieve data or content/ resources from the server. GET requests are stateless because each GET request is independent of previous GET requests. GET requests are normally used for read-only operations.

"Basic Auth" refers to an authentication mechanism used in HTTP communications. Basic Auth allows a client to access protected resources on a server by providing a username and password in the HTTP request headers. When using Basic Auth, the client sends an HTTP request to the server with a username and password. The server receiving the request verifies the username and password. If the username and password are verified, the server allows access to the requested data or content. If the username and password are not verified, the server provides a failure response. Conventional Basic Auth is widely supported for authentication, but has some security limitations as Basic Auth relies on passwords selected by users. Some users select a password that is too simple and can easily be cracked and subject the server to an attack.

Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, network 104, URN-content servers 116A-116N, and URN-content managers 108A-108N. Each of the components shown in FIG. 1 can be implemented via any type of computing device, such as one or more of computing device 700 described in connection to FIG. 7, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) or entity(s) (e.g., a customer or a business). For example, in some implementations, such devices are the type of computing device described in relation to FIG. 7. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

User device 102 can be a client device on a client-side of operating environment 100, while URN-content managers 108A-108N can be on a server-side of operating environment 100. URN-content managers 108A-108N may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or URN-content managers 108A-108N to remain as separate entities.

Application 110 operating on user device 102 can generally be any application capable of facilitating the exchange of information between the user device and the URN-content managers 108A-108N in generating, storing and/or processing signed-URNs and signed-URN content pairs (e.g., content cryptographically paired with a signed URN). In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly. In embodiments, application 110 can be any type of application that is a trusted client (e.g., trusted client 302 of FIG. 3) of URN-content managers 108A-108N.

In accordance with embodiments herein, the application 110 can facilitate embedding cryptographically signed data in URNs of a network protocol in an efficient and effective manner. In operation, a user performs operations through a user interface provided via the application 110 in user device 102. Application 110 generates a request based on the operations performed by the user. In some embodiments, the request is generated by Application 110 without input from the user. Application 110, as a trusted client of URN-content managers 108A-108N, generates a URN for the request through a network protocol with metadata corresponding to the request or response embedded into the URN. The URN includes a public key of a public-private key pair associated with a persona 106A of the user operating application 110 on user device 102. In some embodiments, the URN may be a request to store content data (e.g., any type of content, such as images, video, documents, software/applications, databases, scripts/code, such as application programming interfaces, etc.).

Application 110 cryptographically computes a signature based on the URN with embedded metadata using a private key associated with a public key of application 110, user device 102, or the user operating application 110. In embodiments where the request is to store content, application 110 cryptographically computes the signature based on the URN with embedded metadata and the content being stored using the private key associated with the public key. Application 110 generates a signed URN by encoding or appending the URN with the signature. The signed URN and/or signed URN-content pair of the request is then communicated, verified, processed, and/or stored in URN-content server 116A-116N by URN-content managers 108A-108N based on the type of request embedded within the signed URN. URN-content managers 108A-108N then generates a signed URN as a response to the request, stores the signed URN in URN-content server 116A-116N, and communicates the signed URN to application 110 of user device 102. In some embodiments, URN-content managers 108A-108N deducts an amount determined based on the length/size of the signed URN or signed URN-content pair stored in URN-content server 116A-116N from a wallet 106B associated the persona 106A. In some embodiments, a currency tied to the amount of storage (e.g., price of the currency is tied to a bit of storage) can be utilized by URN-content managers 108A-108N.

Figure 2:
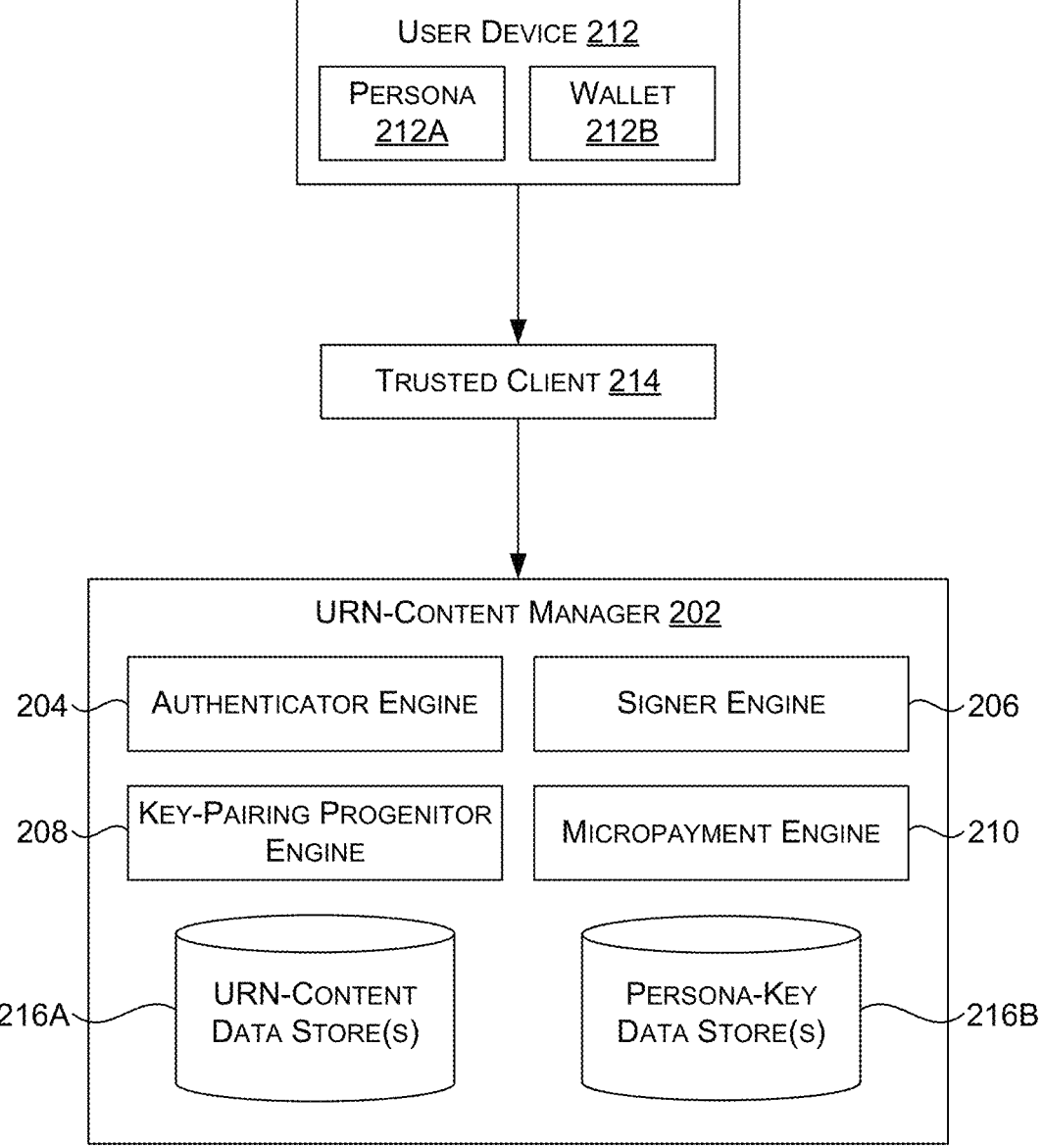
FIG. 2 depicts an example configuration of an operating environment in which some implementations of the present disclosure can be employed, in accordance with various embodiments of the present disclosure.
Figure 3:
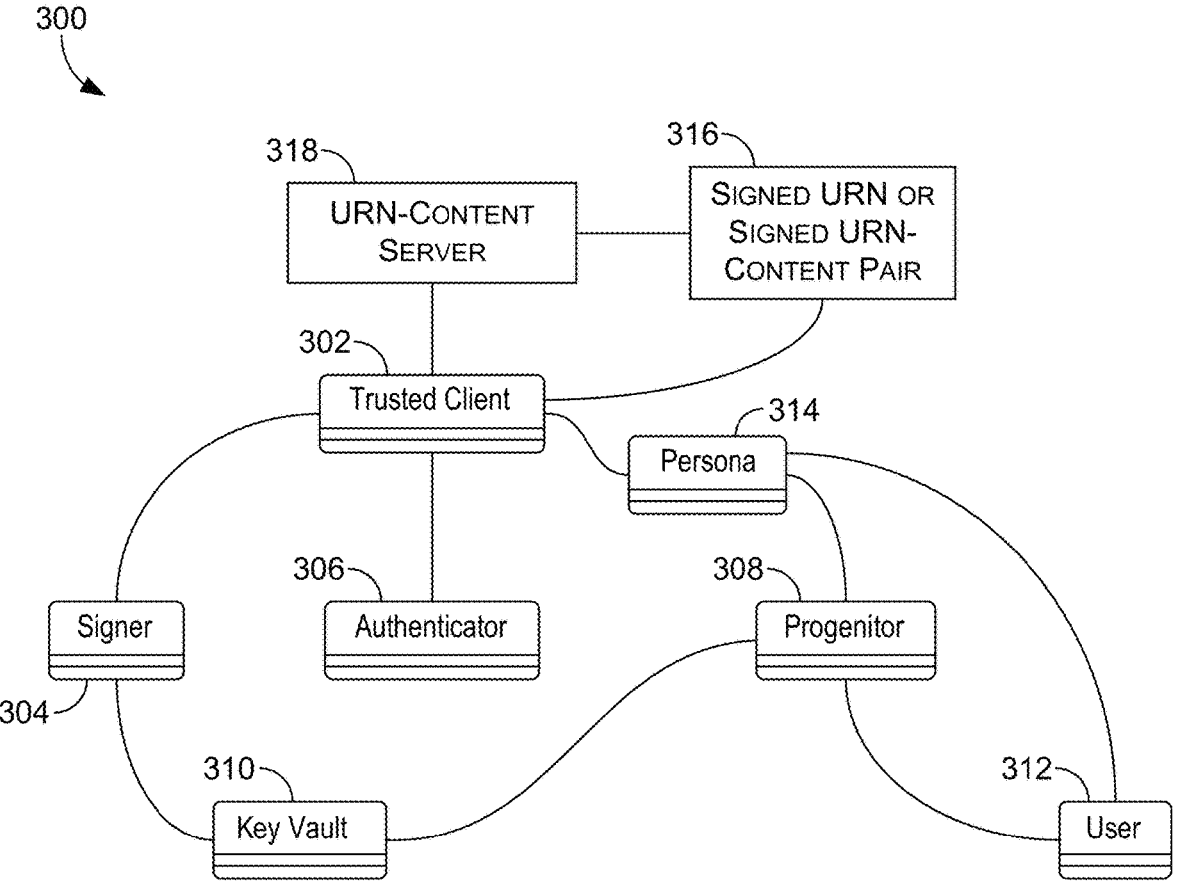
FIG. 3 provides an example diagram for embedding cryptographically signed data in URNs of a network protocol, in accordance with embodiments of the present disclosure.
Figure 4:
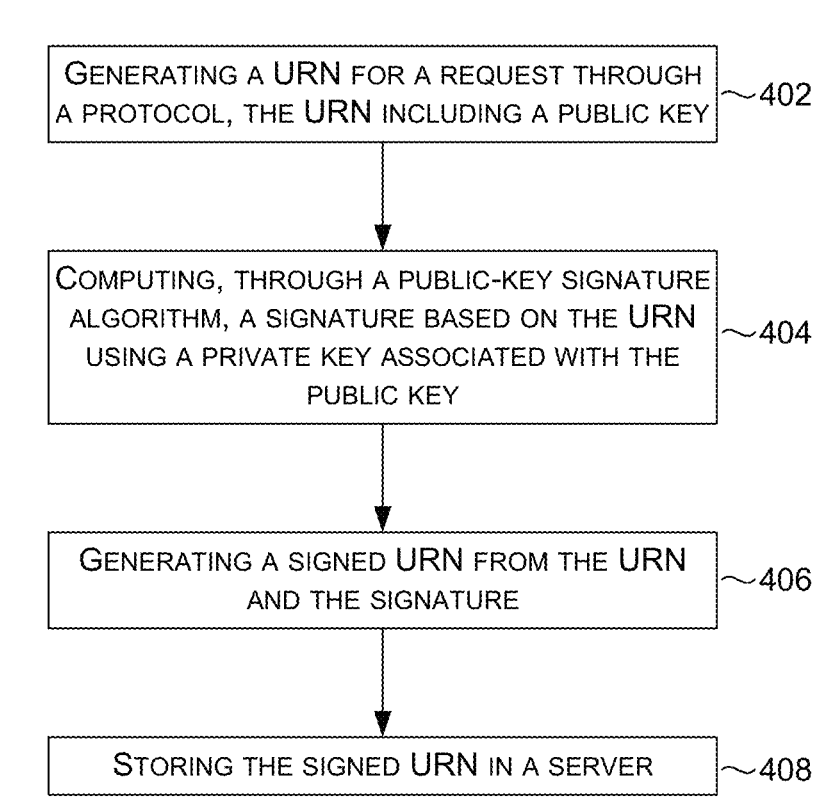
FIG. 4 is a process flow showing a method for embedding cryptographically signed data in URNs of a network protocol, in accordance with embodiments of the present disclosure.

Additional embodiments of URN-content managers 108A-108N is described in further detail above and with respect to URN-content manager 202 of FIG. 2, diagram 300 of FIG. 3, and flow diagrams 400-600 of FIGS. 4-6.

The URN-content managers 108A-108N can obtain user data from user device 102 (e.g., requests from the user device and/or content with the request from the user device) and URN-content servers 116A-116N (e.g., responses from the servers). URN-content servers 116A-116N may be any type of data storage for storing data, such signed URNs and/or content. Generally, the URN-content managers 108A-108N receives data from any number of devices. As such, the URN-content managers 108A-108N can identify and/or collect data from various user devices, such as user device 102, and sources, such as URN-content servers 116A-116N.

URN-content managers 108A-108N can be or include a server (e.g., URN-content server 116A-116N), including one or more processors, and one or more computer-readable media. The computer-readable media includes computer-readable instructions executable by the one or more processors. The instructions can optionally implement one or more components of URN-content managers 108A-108N, described in additional detail below with respect to URN-content manager 202 of FIG. 2.

For cloud-based implementations, the instructions on URN-content managers 108A-108N can implement one or more components, and application 110 can be utilized by a user to interface with the functionality implemented on URN-content managers 108A-108N. In some cases, application 110 comprises a web browser. In other cases, URN-content managers 108A-108N may not be required. For example, the components of URN-content managers 108A-108N may be implemented completely on a user device, such as user device 102. In this case, URN-content managers 108A-108N may be embodied at least partially by the instructions corresponding to application 110.

Thus, it should be appreciated that URN-content managers 108A-108N may be provided via multiple devices arranged in a distributed environment that collectively provide the functionality described herein. Additionally, other components not shown may also be included within the distributed environment. In addition, or instead, URN-content managers 108A-108N can be integrated, at least partially, into a user device, such as user device 102. Furthermore, URN-content managers 108A-108N may at least partially be embodied as a cloud computing service.

Referring to FIG. 2, aspects of an illustrative URN-content management system are shown, in accordance with various embodiments of the present disclosure. At a high level, embodiments described herein embedding crypto-graphically signed data in URNs of a network protocol by generating a URN for a request (e.g., from trusted client 214) or a response of a server (e.g., from URN-content data store(s) 216A) through a network protocol with metadata corresponding to the request or response embedded into the URN (e.g., the type of request or response, a public key of the user or server communicating the request or response, a path of the request or response, expiration of the request or response, other signed URNS embedded into the URN, etc.). A signature is then cryptographically computed (e.g., by trusted client 214 or URN-content data store(s) 216A) based on the URN with embedded metadata and, in some embodiments, also based on the content of the request or response (e.g., such as request to store content, such as images, video, documents, software/applications, databases, scripts/code, etc.). A signed URN is generated (e.g., by trusted client 214 or URN-content data store(s) 216A) by encoding or append-ing the URN with the signature. The signed URN and/or content of the request or response is then communicated, verified, processed, and/or stored (e.g., in URN-content data store(s) 216A) based on the type of request or response embedded within the signed URN.

As shown in FIG. 2, URN-content manager 202 includes an authentication engine 204, a signer engine 206, a key-pairing progenitor engine 208, a micropayment engine 210, a URN-content data store 216A, and a persona-key data store 216B. The foregoing components of URN-content manager 202 can be implemented, for example, in operating environment 100 of FIG. 1. In particular, those components may be integrated into any suitable combination of user devices 102 and/or URN-content managers 108A-108N.

Further, in an example shown in FIG. 2, a user device 212 (e.g., operating user device 102 of FIG. 1) can include a corresponding persona(s) 212A and a digital wallet(s) 212B linked to a corresponding persona(s) 212A. User device 212 can interact with URN-content manager 202 through trusted client 214. Embodiments of persona(s) 212A and trusted client 214 are described in further detail above and with respect to embodiments of persona 314 of FIG. 3 and trusted client 302 of FIG. 3, respectively.

URN-content data store 216A and persona-key data store 216B can store computer instructions (e.g., software pro-gram instructions, routines, or services), data, and/or models used in embodiments described herein. In some implemen-tations, URN-content data store 216A and persona-key data store 216B store information or data received or generated via the various components of URN-content manager 202 and provides the various components with access to that information or data, as needed. Although depicted as two components, URN-content data store 216A and persona-key data store 216B may be embodied as one or more data stores or each as one or more data stores. Further, the information in URN-content data store 216A and persona-key data store 216B may be distributed in any suitable manner across one or more data stores for storage (which may be hosted externally).

In embodiments, data stored in URN-content data store 216A includes data regarding signed URNs or signed-URN content pairs. In some cases, trusted client 214 and/or URN-content manager 202, or components associated there-with, can obtain and/or generate data regarding signed URNs or signed-URN content pairs from client devices (e.g., a user device(s) 212) and/or URN-content manager 202, or components associated therewith. Embodiments of URN-content data store 216A are described in further detail above and with respect to embodiments of URN-content server 318 of FIG. 3.

In embodiments, data stored in persona-key data store 216B includes data regarding public-private key pairs for personas. In some cases, URN-content manager 202, or components associated therewith, can obtain and/or generate data regarding public-private key pairs for personas from client devices (e.g., a user device(s) 212) and/or URN-content manager 202, or components associated therewith. Embodiments of persona-key data store 216B are described in further detail above and with respect to embodiments of key vault 310 of FIG. 3.

The authenticator engine 204 is generally configured to verify the identity of users. The authenticator engine 204 can include rules, conditions, associations, models, algorithms, or the like to verify the identity of users. Embodiments of authenticator engine 204 are described in further detail above and with respect to embodiments of authenticator 306 of FIG. 3.

The signer engine 206 is generally configured to sign URN based on URNs or URN-content pairs using the private key associated with a public key for a persona 212A of a user operating a user device 212 or a server. The signer engine 206 can include rules, conditions, associations, mod-els, algorithms, or the like to sign URN based on URNs or URN-content pairs. Embodiments of signer engine 206 are described in further detail above and with respect to embodi-ments of signer 304 of FIG. 3.

The key-pairing progenitor engine 208 is generally con-figured to generate public-private kay pairs for a persona 212A of a user operating a user device 212 or a server and store the public-private kay pairs in persona-key data store 216B. The key-pairing progenitor engine 208 can include rules, conditions, associations, models, algorithms, or the like to generate public-private kay pairs. Embodiments of key-pairing progenitor engine 208 are described in further detail above and with respect to embodiments of progenitor 308 of FIG. 3.

The micropayment engine 210 is generally configured to deduct an amount determined based on the length/size of the signed URN and/or signed URN-content pair from wallet 212B associated with persona 212A. The micropayment engine 210 can include rules, conditions, associations, mod-els, algorithms, or the like to deduct an amount determined based on the length/size of the signed URN and/or signed URN-content pair. Embodiments of micropayment engine 204 are described in further detail above and with respect to embodiments of URN-content server 318 of FIG. 3.

FIG. 3 provides an example diagram 300 for embedding cryptographically signed data in URNs of a network proto-col, in accordance with embodiments described herein. As described herein, such embedding cryptographically signed data in URNs of a network protocol can be used to optimize data storage for increased data provenance, authentication, authorization, and/or pay-per-use data storage. Diagram 300 is an example diagram for embedding cryptographically signed data in URNs of a network protocol.

At a high level, communication through a network pro-tocol for data transmission, storage, and access generates signed URN(s) or signed URN-content pair(s) 316 for storage in URN-content server(s) 318. For example, user 312 has a specific persona 314 (described in more detail below) when communicating over the network through URN-content server(s) 318 (e.g., when a user accesses data, stores data, etc. from URN-content server(s) 318). Progenitor 308 generates public-private key pairs (public-private key pair is referred to interchangeable as a key pair) for the specific persona 314, which are stored in the key vault 310. The user 312 interacts with trusted client 302 (e.g., a trusted application of URN-content server(s) 318). For example, trusted client 302 may be an application for storing photos and the user 312 interacts with trusted client 302 in order to store photos in URN-content server(s) 318. As another example, trusted client 302 may be an application that allows a user 312 to transmit and/or receive payment and the user 312 interacts with trusted client 302 to transmit and/or receive payment. When data is communicated over URN-content server(s) 318 through trusted client 302 (e.g., when a user accesses data, stores data, etc. from URN-content server(s) 318 through trusted client 302), a signed URN and/or signed URN-content pair 316 is generated based on the requests/responses of the communications. For example, user 312 submits a request to URN-content server(s) 318 through trusted client 302. Trust client 302 submits the request by generating a URN with metadata of the request embedded into the URN. Trusted client 302 generates a signed URN by cryptographically signing the URN. URN-content server(s) 318 then authenticates the request through authenticator 306 and stores and processes the request.

In embodiments, signed URN or signed URN-content pair 316 is a cryptographically signed statement by an entity about specific attributes or characteristics, with the authenticity and integrity ensured by the signature (e.g., generated through trusted client 302). In this regard, the trustworthiness of the content depends on the credibility of the signing entity. In embodiments, URN-content server(s) 318 can be a server, local computer, phone, or other device responsible for storing, retrieving, and optionally generating signed URN(s) or signed URN-content pair(s) 316 based on other signed URN(s) or signed URN-content pair(s) 316, as well as hosting personas and replicating signed URN(s) or signed URN-content pair(s) 316 across URN-content server(s) 318. URN-content server(s) 318 can operate in both web-based and local environments, accommodating various hardware and software configurations. Further, in some embodiments, URN-content server(s) 318 supports micropayments for each operation, allowing service providers to monetize their services while offering users a flexible, pay-per-use model for interacting with the digital identity and authentication ecosystem.

In embodiments, URN-content server(s) 318 can charge a persona 314 (e.g., a wallet associated with a persona 314) for storage of content, signed URNs, metadata, and/or ancillary data; data ingress and egress; or any other operations. In some embodiments, URN-content server(s) 318 can pay a user who owns a signed URN or signed URN-content pair 316 royalties based on other users accessing the signed URN or signed URN-content pair 316. In some embodiments, URN-content server(s) 318 refunds the cost of deleted storage (e.g., minus nominal restocking fees) when a user 312 deletes a signed URN or signed URN-content pair 316 from the URN-content server(s) 318. In some embodiments, URN-content server(s) 318 can utilize a currency tied to the amount of storage (e.g., price of the currency is tied to a bit of storage). For example, a currency can be defined as the cost of buying one bit of non-redundant permanent random access cloud storage.

In some embodiments, URN-content server(s) 318 supports PUT operations and GET operations. For example, with respect to PUT operations, a PUT operation may define a redirect to content of a signed URN or signed URN-content pair 316. In some embodiments, the redirected URL may be unsigned. In some embodiments, the redirect signed URN or signed URN-content pair 316 must be signed and stored within URN-content server(s) 318. In some embodiments, the PUT operation to define the redirect must be signed as a signed URN or signed URN-content pair 316. As another example, with respect to PUT operations, a put operation may be a delete operation to delete signed URN(s) or signed URN-content pair(s) 316.

In some embodiments, URN-content server(s) 318 can disable PUT operations for a persona(s) 314 (e.g., except those needed to reinstate disabled operations). In some embodiments, URN-content server(s) 318 can disable GET operations for a persona(s) 314 (e.g., to prevent broadcasting criminal content). In some embodiments, URN-content server(s) 318 can disable delete operations (e.g., by court order). In some embodiments, URN-content server(s) 318 can delete all data of a persona 314 (e.g., all signed URN or signed URN-content pair 316 associated with a persona 314) on the URN-content server(s) 318 (e.g., by a court order).

In some embodiments, URN-content server(s) 318 cannot disable operations at more granular level than for a persona 314. In some embodiments, URN-content server(s) 318 cannot perform operations without permission of the persona 314. In some embodiments, signed URN(s) or signed URN-content pair(s) 316 stored in URN-content server(s) 318 cannot be accessed without proper permissions.

In embodiments, key vault 310 can be a protected storage system that centralizes the management of cryptographic key pairs, enabling access control and maintaining the confidentiality, integrity, and availability of the key pairs. In some embodiments, key vault 310 is integrated into URN-content server(s) 318. In embodiments, signer 304 is an application that can sign URNs on behalf of the user 312 using the key vault 310. For example, signer 304 accesses the user's 302 private key stored securely in the key vault 310 and generates a digital signature for the signed URN or signed URN-content pair 316, ensuring the authenticity and integrity of the signed URN or signed URN-content pair 316. In some embodiments, key vault 310 can be integrated into URN-content server(s) 318.

In embodiments, authenticator 306 can be a system, device, or component responsible for verifying the identity of users (e.g., user 312) in the cybersphere (e.g., the cybersphere is the interconnected digital realm comprising websites, applications, platforms, and local computers, allowing for online and local interactions that can be either temporary or persistent in nature) by validating users' credentials, signed URN(s) or signed URN-content pair(s) 316, and/or cryptographic key pairs. The authenticator 306 can ensure accurate establishment of the user's 302 identity, provide a foundation for secure access control, and authorize interactions within the digital realm. In some embodiments, authenticator 306 authenticates the user 312 before a request reaches URN-content server(s) 318. In this regard, if a request reaches URN-content server(s) 318 prior to authentication, the URN-content server(s) 318 can return a response indicating that authentication has not occurred. In some embodiments, authenticator 306 can be integrated into a URN-content server(s) 318.

In embodiments, trusted client 302 can be software application or platform, such as a web browser or mobile application that provides a user 312 access to the cybersphere. The trusted client 302 can interface with the authenticator 306, signer 304, URN-content server(s) 318, and other services as needed, which enables the user 312 to securely interact with the digital realm. Trusted client 302 can manage the user experience for user 312, handle communication with various entities, and ensure the security and privacy of the user's 302 data and interactions.

For example, the trusted client 302 interacts with the URN-content server(s) 318 to generate, store, retrieve (e.g., retrieve to verify, access, etc.), update (e.g., generate a new signed URN or signed URN-content pair 316 based on the existing signed URN or signed URN-content pair 316, etc.), etc. signed URN or signed URN-content pair 316 for the user's 302 personas 314. As another example, trusted client 302 interacts with the authenticator 306 for authentication purposes when the user 312 accesses the cybersphere. As another example, trusted client 302 interacts with the signer 304 to sign URNs to generate signed URNs and/or content 316 on behalf of the user 312 during specific interactions within the cybersphere. In yet another example, trusted client 302 interfaces with the progenitor 308 on behalf of the user 312, requesting the creation of a key pair (a key pair refers to a public-private key pair), and managing the secure association and storage of the key pair in the key vault 310.

In embodiments, user 312 can be a person or business engaging in activities within the cybersphere. For example, user 312 accesses and interacts with various services and entities in the cybersphere through a trusted client 302, which manages the user experience, security, and privacy of the user's 302 data and interactions, and interfaces with various entities on behalf of the user 312.

In embodiments, persona 314 can be a distinct identity or role assumed by a user 312 within the cybersphere, characterized by unique data, behavior patterns, preferences, communication styles, etc. In this regard, a persona 314 enables user 312 to engage differently with other personas and services, facilitating a variety of interactions and activities throughout cyberspace. Each persona 314 of each user 312 can be defined by a single asymmetric cryptographic key pair and all associated signed URNs and/or content 316. In some embodiments, if a private key of a persona 314 is compromised, the persona 314 becomes exposed, which jeopardizes the security and control over the signed URNs and/or content 316 of the persona 314, potentially leading to unauthorized access and misuse. Persona 314 can have multiple wallets to wallets allow fine-grained control over costs for limiting losses, tracking and categorizing costs, allocating resources and budgets, forecasting, etc.

In embodiments, a user 312 in the cybersphere can have one or more personas 314, each representing a distinct identity or role, allowing them to engage differently with other personas and services. For example, a persona of a user may be a user's account when interacting with a specific website/application (e.g., a trusted client 302), such as a social networking website or any type of website/application. In this regard, a persona refers to the identity or role that a user adopts or is assigned when interacting with a specific system, website, or application.

In some embodiments, a persona can serve as a representation of the user within a digital platform. For example, on a social media website, a user's persona might include their profile picture, username, biographical information, interests, and other attributes that define their online identity. In some embodiments, persona also encapsulates a user's behavior and activity on a platform. For example, a user's behavior and activity on a platform can include posts they've made, friends or connections they have, groups they're part of, and even the ways in which they interact with the platform. In some embodiments, a persona can be associated with specific roles or access rights. For example, in a content management system, one user's persona might be that of an "editor" with rights to modify content, while another's might be a "viewer" with only the ability to read. In some embodiments, digital services can use a persona to offer personalized experiences. For example, based on the information associated with a persona, digital services can recommend content, products, or other features tailored to that user. In some embodiments, users can manage their personas with respect to data privacy of the user. For example, services can ensure that users have control over their personas, such as allowing user to modify or delete their personas, and/or providing information regarding how the user's data is used and shared. In some embodiments, a persona can be connected and/or associated with specific clients (e.g., trusted client 302) or interfaces. In this regard, the persona's interactions with the specific client or interface can determine what data gets shared or how the persona is presented.

Specific examples of personas across different digital systems and platforms can include:

(1) A social media persona, such as a regular user, page administrator, group moderator with a profile picture, cover photo, username, and bio as well as status updates, photos uploaded, pages liked, groups joined, friends made, and/or etc.

(2) A gaming persona, such as a regular player, premium member with extra features, game tester identified by gamer tag, avatar with data games played, achievements unlocked, friends made, multiplayer sessions, and/or etc.

(3) An e-commerce persona, such as a username, profile picture, email address, wish list, purchases made, items searched for, reviews written, and recommendations for products based on browsing history and/or previous purchases, and/or etc.

(4) An enterprise software persona, such as a sales representative with access to own leads, sales manager with access to all team leads, system administrator with broad system controls identified by employee name, title, department with leads entered, deals closed, reports generated, and/or etc.

(5) An online learning persona, such as a student, course instructor, course creator with a name, profile picture, biography, courses taken, assignments submitted, forums participated in, and/or etc.

(6) A forum/community persona, such as a regular user, moderator, premium member with additional features with a username, karma points, trophies, Posts submitted, comments made, upvotes given/received, and/or etc.

(7) A cloud storage persona, such as an owner of a file, collaborator with editing rights, viewer without editing rights with an account name and email, files uploaded, shared, or deleted, and/or etc.

The specific examples of personas provide examples as to how a persona can manifest in different digital platforms, thereby shaping the user's experience and their interaction with various systems. In this regard, each platform has its own unique way of representing, categorizing, and interacting with personas of its users.

Persona(s) 314 can act as intermediaries for user(s) 312, enabling them to interact with other personas within the cybersphere, carrying out tasks or communication on their behalf. In some embodiments, a persona 314 can have signed URN or signed URN-content pair 316 stored on multiple URN-content servers 318, with the possibility of having unique signed URN or signed URN-content pair 316 on different servers or duplicated signed URN(s) or signed URN-content pair(s) 316 across servers, depending on the specific requirements and setup. In embodiments, a URN-content server(s) 318 can manage multiple signed URN(s) or signed URN-content pair(s) 316, which may belong to different personas 314, ensuring secure storage and retrieval, and facilitating the generation of new signed URN(s) or signed URN-content pair(s) 316 based on existing signed URN(s) or signed URN-content pair(s) 316.

In embodiments, a persona 314 can make and own multiple signed URN(s) or signed URN-content pair(s) 316, with each signed URN(s) or signed URN-content pair(s) 316 asserting specific attributes or characteristics. For example, signed URN(s) or signed URN-content pair(s) 316 can be used to authenticate, authorize, or provide information about the persona 314 in various digital identity and authentication contexts. In embodiments, signed URN(s) or signed URN-content pair(s) 316 associated with a persona can be verified by other personas or services using the public key from the unique key pair of the persona 314 as generated by progenitor 308 and stored in key vault 310. In this regard, the verification of signed URN(s) or signed URN-content pair(s) 316 can ensure the authenticity and integrity of the signed URN(s) or signed URN-content pair(s) 316 while maintaining trust in the digital identity and authentication context.

In embodiments, progenitor 308 can be an application or service responsible for generating and managing key pairs for personas 314, ensuring the secure association of key pairs with users 312, and maintaining the security and integrity of the key pairs throughout their lifecycle. Progenitor 308 can also implement strong authentication protocols and security measures to prevent the false association of key pairs with users 312. In some embodiments, progenitor 308 can be integrated into a URN-content server(s) 318. In embodiments, progenitor 308 provides a fully-decentralized creation of personas 314 as a persona 314 is created by generating an asymmetric key pair, which requires no central authority.

In embodiments, progenitor 308 generates a unique key pair for a persona 314 and stores it in a key vault 310. Progenitor 308 ensures that only authorized users 312 can create and associate key pairs with their personas 314 through strong security measures and authentication protocols, such as multi-factor authentication and digital signatures. Progenitor 308 can securely link the generated key pairs to the user's 312 personas 314, enabling secure communication, authentication, and other interactions within the cybersphere. In some embodiments, the progenitor 308, trusted client 302, or another designated entity is responsible for securely transferring the generated key pair to the key vault 310, ensuring the confidentiality, integrity, and availability of the key pair.

For example, progenitor 308 generates a unique asymmetric key pair for each new persona 314 associated with a user 312. Progenitor 308 links the generated key pair with the user's persona, ensuring that the persona 314 can use the key pair for secure communication, authentication, and other interactions within the cybersphere. Progenitor 308 securely stores the generated key pair in key vault 310, ensuring the confidentiality, integrity, and availability of the key pairs. The private key of the key pair can be stored in a secure key vault 410, while the public key of the key pair can be shared by a user 312 with other entities within the cybersphere.

In embodiments, progenitor 308 implements strong security measures and authentication protocols to ensure that only authorized users 312 can create and associate key pairs with their personas 314, such as multi-factor authentication, secure communication channels, and digital signatures to verify the authenticity of requests. Progenitor 308 can manage the entire lifecycle of the key pairs, including key rotation, expiration, and revocation in order to maintain the security and integrity of the personas 314 and their associated key pairs over time. Progenitor 308 can implement a secure mechanism for key pair recovery in case a user 312 loses access to their private key, without compromising the security of the system. Progenitor 308 can maintain logs and records of key pair generation, association, and usage in order to enable auditing and monitoring of the system to identify any potential security risks or unauthorized activities. In embodiments, the processes, storage mechanisms, and security measures of progenitor 308 comply with relevant industry standards and data protection regulations (e.g., General Data Protection Regulation (GDPR), Health Insurance Portability and Accountability Act (HIPAA), etc.). In some embodiments, if a key pair is compromised, the signed URN(s) or signed URN-content pair(s) 316 associated with the affected persona 314 need to be migrated to a new, uncompromised persona 314.

In this regard, embodiments described herein implement a novel protocol designed to address multiple challenges associated with data provenance, authentication, authorization, micropayments, and pay-per-use micro-services. Embodiments described herein can integrate these functionalities seamlessly to offer a secure, efficient, and user-friendly platform for a wide range of applications, such as digital content management, secure data sharing, and decentralized e-commerce transactions. Further, embodiments described herein leverage innovative cryptographic techniques, smart contracts, and distributed ledger technology to provide an end-to-end solution that promotes trust, transparency, and cost-effectiveness across various industries and use cases.

In some embodiments, countersigning can be used when multiple parties need to affirm their agreement to a particular document, statement, or set of terms. Generally, when using a signed URN or signed URN-content pair, countersigning provides another layer of cryptographic endorsement to an already-signed item. One example of a countersigning process is provided herein. In particular, an initial party may create a document or statement and uses a private key to sign this document. The result is a signed URN or signed URN-content pair which incorporates the original content and the initial party's digital signature. The initial party can then present the signed URN or signed URN-content pair to a subsequent party.

In some cases, before countersigning, the subsequent party verifies the signature of the initial party, for example, using the initial party's public key to ensure that the content was indeed signed by the initial party and/or that the content hasn't been tampered with.

In accordance with verifying the signature of the initial party, the subsequent party can use a corresponding private key to sign the already-signed signed URN or signed URN-content pair. The subsequent party's signature does not overwrite the initial party's signature, but adds another layer of signature to the signed URN or signed URN-content pair (e.g., as a countersigned URN or countersigned URN-content pair). Thereafter, the countersigned URN or countersigned URN-content pair can then be distributed or stored. Any party who wishes to verify the contract can use both the initial party's and the subsequent party's public keys to confirm the authenticity and integrity of the document and to affirm that both parties have agreed to its terms. Any number of parties and any number of signatures can be utilized by signed URN or signed URN-content pair to generate a countersigned URN or countersigned URN-content pair.

In embodiments, countersigning affirms that both parties are in mutual agreement regarding the content within the signed URN or signed URN-content pair. Countersigning is a digital confirmation of consent or accord between the parties involved. In embodiments, countersigning ensures non-repudiation. In this regard, neither party can later deny their endorsement or agreement to the document since their unique digital signatures are affixed to it. In embodiments, for third parties or external entities that may view or rely upon the countersigned URN or countersigned URN-content pair in the future, the multiple signatures can offer a higher degree of trust. In this regard, the third parties or external entities can be assured that multiple entities have reviewed and agreed upon the content. In embodiments, depending on the nature of the document and the parties involved, further layers of countersigning can be added, creating a chain of trust. For example, a chain of trust can be utilized in scenarios where multiple endorsements are required, such as in some corporate decisions or multilateral agreements. In embodiments, with each added countersignature, the complexity of the verification process is increased as multiple public keys are required for the verification process. In embodiments, a countersigned document of a countersigned URN-content pair in the digital realm can carry legal weight, subjecting parties to the terms and obligations laid out in the content that has been countersigned. In embodiments, any change to the content, post-signing or countersigning, would invalidate the signatures. In this regard, invalidating the signatures due to changes to the content ensures that content remains unchanged and authentic post-agreement, adding another layer of security and trust.

In this regard, countersigning a signed URN or signed URN-content pair leverages cryptographic methods to ensure authenticity, integrity, and non-repudiation, thereby providing a mechanism that can serve as a robust tool in digital transactions, agreements, and collaborations, ensuring that all involved parties are in mutual agreement.

In some embodiments, signed URN or signed URN-content pairs can be utilized by systems that not only store and manage data, but also process and react to data dynamically. In this regard, signed URN or signed URN-content pairs can be utilized in data pipelines in order to provide automated workflows that streamline complex sequences of data operations. Signed URN or signed URN-content pairs can be utilized to enable a series of interconnected tasks, from data ingestion to processing and output, allowing for real-time reactions and intricate data transformations. For example, in order to utilize signed URN or signed URN-content pairs in a data pipeline, the system can be an extensible, self-describing architecture where every entity and relationship is also a signed URN or signed URN-content pair, thereby not only providing a unified mechanism for handling all these components, but also leveraging the inherent security and integrity features of signed URN or signed URN-content pairs.

In this regard, signed URN or signed URN-content pairs corresponding to an event (e.g., a signed event URN) represents a signed URN or signed URN-content pair that signifies an event. For example, an event is generated when a new signed URN or signed URN-content pair is made or updated within the URN-content server. A signed URN or signed URN-content pair corresponding to a subscription (e.g., assigned subscription URN) is a signed URN or signed URN-content pair representing a subscription. For example, a signed subscription URN or signed subscription URN-content pair can describe the patterns or types of events a persona is interested in and what signed computation URN or signed computation URN-content pairs should be executed when the event pattern matches. A signed URN or signed URN-content pair corresponding to a computation (e.g., a signed computation URN) is a signed URN or signed URN-content pair that holds executable or interpretable code. For example, when an associated signed event URN is detected via a subscription URN, the code within the signed computation URN is executed. In some embodiments, the URN-content server includes an isolated and secure execution environment where computations from signed computation URNs are executed in order to ensure the computations run securely and without affecting the integrity of the URN-content server.

In some embodiments, when specific activities around a signed URN or signed URN-content pair occur (e.g., creation, update), an associated signed event URN is generated. In some embodiments, signed event URNs are matched against active signed subscription URNs to determine if any subscribed signed computation URN should be triggered. In some embodiments, signed subscription URNs are linked to specific signed computation URNs. For example, when a signed subscription URN's criteria match a particular signed event URNs, it triggers the associated signed computation URN for execution. In some embodiments, signed computation URNs, when activated, are executed within the designated execution environment in the URN-content server. For example, once a signed computation URN is executed and yields a result, it might lead to the generation of a new signed URN or signed URN-content pair, which represents the output of that computation. In some embodiments, personas create or subscribe to signed subscription URNs based on their specific contexts or interests, reflecting the granularity and specificity of their digital interactions.

In some embodiments, the URN-content server's functionality is expanded to not just handle the storage and retrieval of signed URNs and/or signed URN-content pairs, but also the execution of signed URNs that represent computations in response to signed event URNs. In embodiments, the utility of signed URNs and/or signed URN-content pairs in the system becomes even more diverse as various functionalities (e.g., events, subscriptions, and/or computations) are now represented as specific types of signed URNs and/or signed URN-content pairs.

One example process of digital identity and authentication ecosystem in the data pipeline is provided herein. In particular, initially, a persona creates a signed URNs and/or signed URN-content pair, which could pertain to events, subscriptions, computations, etc. The signed URNs and/or signed URN-content pair can be sent to a URN-Content server, which acts as the storage and management system for these signed URNs and/or signed URN-content pairs. When certain conditions (specified in the signed URNs and/or signed URN-content pairs) are met, events may be triggered. These can be real-world events or digital activities that need to be processed. In some cases, other personas or systems that have subscribed to these events are notified and/or specific functionalities are activated based on the event.

In cases in which the event or subscription leads to a signed computation URN or signed computation URN-content pair, the specified computation (described in executable or interpretable code) is executed within the URN-content server or another designated computational environment. The outcome of computations can be the generation of new signed URNs and/or signed URN-content pairs, which are then stored in the URN-content server. In embodiments, other personas or systems can request, retrieve, and verify these signed URNs and/or signed URN-content pairs from the URN-content server.

In this regard, in embodiments encapsulating events, subscriptions, computations, etc., as signed URNs and/or signed URN-content pairs, the system achieves a holistic, modular, and consistent approach to digital identity and interactions. The unified representation as signed URNs and/or signed URN-content pairs also ensures that all these entities inherit the cryptographic security, authenticity, and integrity guarantees associated with signed URNs and/or signed URN-content pairs.

In some embodiments, countersigning is performed in the context of data pipeline modifications where signed URNs and/or signed URN-content pairs specify events, subscriptions, computations, etc. One example of such a countersigning is provided herein. In particular, initially, a persona may create a signed URNs and/or signed URN-content pair, which could be an event, subscription, computation, and/or etc. that is signed using the persona's private key. The initiating persona may present the signed URNs and/or signed URN-content pair to another persona for countersignature. For example, the personas can be co-creating an event or co-subscribing to a computation. The second persona verifies the initial signature using the initiating persona's public key. This ensures the signed URNs and/or signed URN-content pair was indeed made by the initiating persona and hasn't been altered. After verification of the initial signature, the second persona uses their private key to countersign the signed URNs and/or signed URN-content pair, adding another layer of cryptographic endorsement. The countersigned URN and/or URN-content pair may be stored in the URN-content server. Any other persona or entity wishing to validate the countersigned URN and/or URN-content pair can use the public keys of both involved personas to confirm the authenticity of the countersigned URN and/or URN-content pair.

In embodiments, countersigning can be a tool for collaboration. For example, two or more personas might co-create an event or jointly subscribe to a computation, and countersigning can be a way to ensure mutual agreement. In this regard, neither persona can deny their endorsement or involvement in the creation or agreement of the signed URN since their unique digital signatures are affixed to it. Further, similar to the notion of a chain of trust, a series of countersigned URNs could create a "signed URNs and/or signed URN-content pair chain," showing a sequence or flow of endorsed events or computations in the data pipeline. Even further, countersigning introduces another layer of verification in the pipeline, ensuring that not just one but multiple personas have validated a particular signed URNs and/or signed URN-content pair. As well, in the context of signed computation URNs, countersigning can serve as a confirmation that the code or computation is approved by multiple personas. Further, the countersignature ensures that the signed URNs and/or signed URN-content pair remains immutable after agreement. In this regard, any change post-countersignature would require a new set of signatures. Further, if a signed computation URN that results in new signed URNs and/or signed URN-content pairs is countersigned, the countersigning can provide a higher level of trust in the resulting signed URNs and/or signed URN-content pairs, knowing that the computation was mutually endorsed. Even further, for computations or events that have contractual or transactional implications, countersigning solidifies the agreement, and any resultant signed URNs and/or signed URN-content pairs can carry the weight of mutual consent.

In this regard, countersigning, in the context of the data pipeline and signed URNs and/or signed URN-content pairs, leverages the security and integrity features inherent in the process. Given the dynamic and collaborative nature of data pipelines, countersigning provides a mechanism for multiple personas to collaboratively engage, ensuring that each step or signed URNs and/or signed URN-content pairs in the pipeline is mutually agreed upon and validated, thereby not only enhancing the trustworthiness of the pipeline but also fortifies the credibility of resultant signed URNs and/or signed URN-content pairs.

In some embodiments, signed URNs and/or signed URN-content pairs can be used in the financial services industry. For example, every financial transaction generates a signed URNs and/or signed URN-content pair, encapsulating all relevant details such as amount, date, parties involved, and a unique transaction identifier. Signed URNs and/or signed URN-content pairs are signed digitally by the transacting parties, making them tamper-evident and binding. As signed URNs and/or signed URN-content pairs pass through various financial processes, they are aggregated, creating a comprehensive transaction chain that reflects the complete lifecycle of a financial transaction. Auditors, regulatory bodies, and stakeholders can verify the authenticity of each transaction by checking the digital signatures against the public keys of the entities involved. In this regard, signed URNs and/or signed URN-content pairs allows for the real-time verification of transactions, significantly speeding up the auditing process. Further, the immutability of signed URNs and/or signed URN-content pairs and their cryptographic verification helps to prevent and detect fraudulent activities. Even further, signed URNs and/or signed URN-content pairs provides an audit trail that meets the stringent requirements of financial regulators. As well, by automating the verification process, signed URNs and/or signed URN-content pairs reduces manual effort, leading to operational cost savings.

In some embodiments, signed URNs and/or signed URN-content pairs can be used in the real estate industry. For example, smart contracts, supported by signed URNs and/or signed URN-content pairs, automate and enforce the terms of real estate agreements, reducing the need for traditional intermediaries who typically contribute to the bulk of transaction fees. In this regard, smart contracts execute automatically based on predefined rules, which helps prevent disputes that often arise from contractual ambiguities or manual errors and every transaction step and agreement term is recorded as a signed URNs and/or signed URN-content pairs, creating an unalterable and transparent transaction history. Further, the cryptographic nature of smart contracts and signed URNs and/or signed URN-content pairs ensures the authenticity of all transaction documents, reducing the risk of fraud.

In some embodiments, signed URNs and/or signed URN-content pairs can be used in supply chain management. For example, signed URNs and/or signed URN-content pairs can transform supply chain management by creating a seamless and verifiable chain of custody for goods. Each step in a product's journey is documented as a signed URNs and/or signed URN-content pair, signed by the relevant party, and linked to form a complete, immutable history. In this regard, manufacturers, shippers, wholesalers, and retailers generate signed URNs and/or signed URN-content pairs at each touchpoint, which include details like production data, batch numbers, shipment times, and receiving confirmations. Each signed URNs and/or signed URN-content pair is cryptographically signed, ensuring the data is tamper-proof and authentic. This digital signature acts as a seal of approval from the party responsible at each step. Interested parties can instantly verify the authenticity of the product information by checking the digital signatures against the public keys of the entities involved. As products move through the supply chain, new signed URNs and/or signed URN-content pairs are aggregated with existing ones, creating a comprehensive product history that is transparent and traceable.

With reference now to FIGS. 4-6, FIGS. 4-6 provide method flows related to facilitating embedding cryptographically signed data in URNs of a network protocol, in accordance with embodiments of the present technology. Each block of method 400, 500 and 600 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 4-6 are exemplary only and not intended to be limiting. As can be appreciated, in some embodiments, method flows 400-600 can be implemented, at least in part, to facilitate embedding cryptographically signed data in URNs of a network protocol.

Turning to FIG. 4, a flow diagram is provided showing an embodiment of a method 400 for embedding cryptographically signed data in URNs of a network protocol, in accordance with embodiments described herein. Initially, at block 402, a URN is generated for a request through a network protocol where the URN includes a public key associated with a persona. For example, a request may be generated to transmit payment. As another example, a request may be generated to store content. At block 404, a signature is computed through a public-key signature algorithm, such as public-key signature algorithm based on elliptic curve cryptography (e.g., Ed25519), hash-based cryptography (e.g., LMS, XMSS, etc.), lattice-based cryptography (e.g., NTRU-Encrypt), multivariate cryptography (e.g., Rainbow), and/or any public-key cryptography algorithm, based on the URN using a private key associated with the public key. At block 406, a signed URN is generated by encoding or appending the URN with the signature. At block 408, the signed URN is stored in a server.

Turning to FIG. 5, a flow diagram is provided showing an embodiment of a method 500 for embedding cryptographically signed data in URNs of a network protocol based on a pairing of the URN with content, in accordance with embodiments described herein. Initially, at block 502, a URN for a request to store content data (e.g., any type of content, such as images, video, documents, software/applications, databases, scripts/code, such as application programming interfaces, etc.) is generated. At block 504, a signature is computed through a public-key signature algorithm, such as public-key signature algorithm based on elliptic curve cryptography (e.g., Ed25519), hash-based cryptography (e.g., LMS, XMSS, etc.), lattice-based cryptography (e.g., NTRUEncrypt), multivariate cryptography (e.g., Rainbow), and/or any public-key cryptography algorithm, based on the URN and the content data using a private key associated with the public key. For example, the content data and/or the URN may be hashed in order to compute the signature using Ed25519 using the private key associated with public key of the user or entity generating the request. At block 506, a signed URN is generated by encoding or appending the URN with the signature. At block 508, the content is encoded with the signed URN. At block 510, the content encoded with the signed URN is stored in a server.

Turning to FIG. 6, a flow diagram is provided showing an embodiment of a method 600 receiving cryptographically signed data embedded in URNs of a network protocol, in accordance with embodiments described herein. Initially, at block 602, data to be stored and a signed URN is received through a network protocol. The signed URN includes a URN and a signature based on the URN and data to be stored. The URN includes metadata corresponding to a request to store data. At block 604, the signed URN is verified based on a signature of the signed URN and the data as the signature of the signed URN was computed through a public-key signature algorithm, such as public-key signature algorithm based on elliptic curve cryptography (e.g., Ed25519), hash-based cryptography (e.g., LMS, XMSS, etc.), lattice-based cryptography (e.g., NTRUEncrypt), multivariate cryptography (e.g., Rainbow), and/or any public-key cryptography algorithm, based on a URN (e.g., the signed URN without the signature) and the data using a private key associated with a public key in the URN. At block 606, the data encoded with the signed URN is stored in a server. At block 608, an amount determined based on the length/size of data or data encoded with the signed URN is deducted from a wallet associated the public key of the request to store the data. At block 610, a signed URN is generated through the network protocol as a response to the request. For example, the response is generated by generating a URN for the response with a public key of a server responding to the request and metadata corresponding to the request; computing a signature through a public-key signature algorithm (e.g., Ed25519) based on the URN for the response using a private key associated with the public key of the server responding to the request; encoding the signature into the URN for the response as the response; and storing the response in the server.

Having briefly described an overview of aspects of the technology described herein, an exemplary operating environment in which aspects of the technology described herein may be implemented is described below in order to provide a general context for various aspects of the technology described herein.

Figure 7:
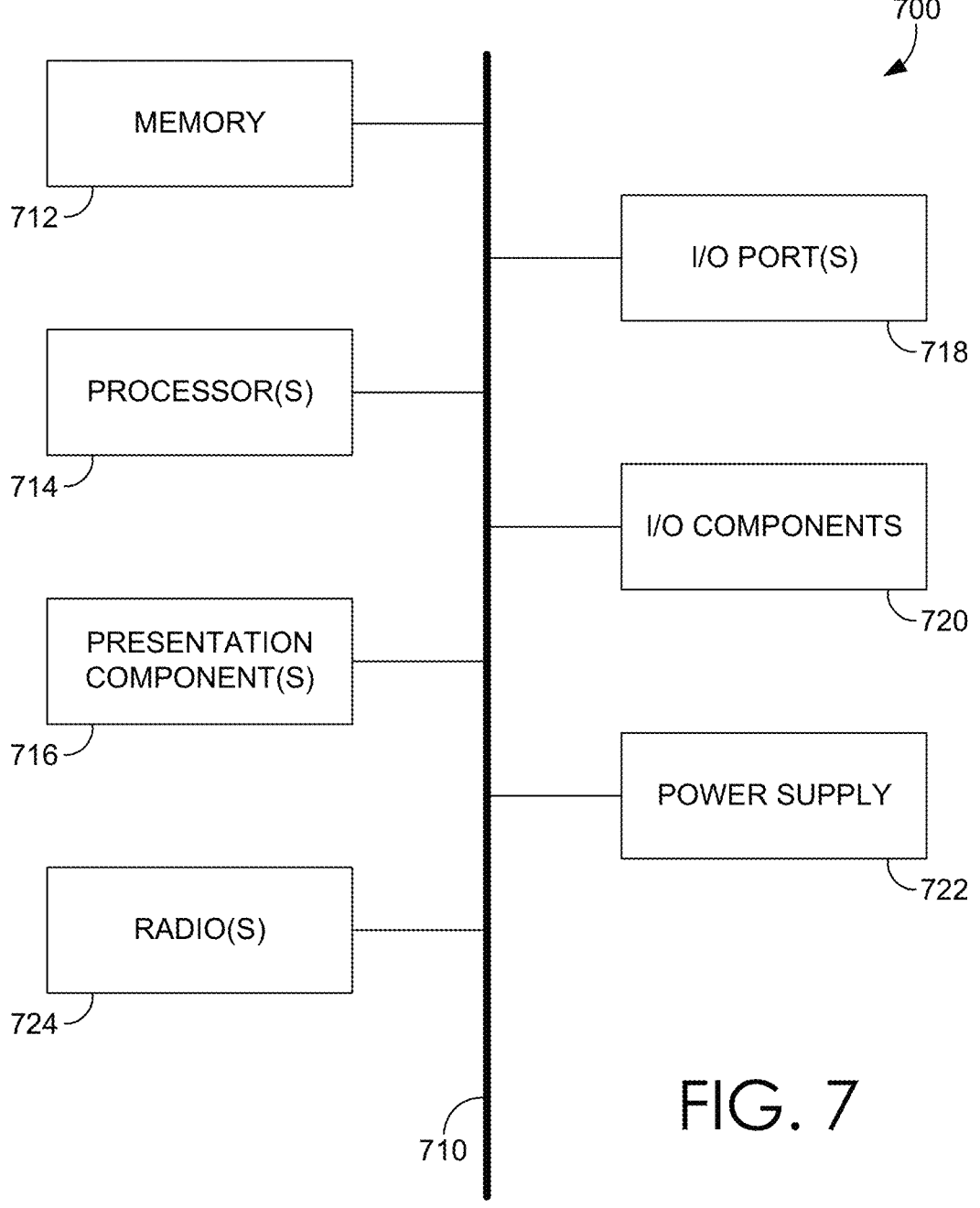
FIG. 7 is a block diagram of an example computing device in which embodiments of the present disclosure can be employed.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more buses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
generating a uniform resource name (URN) for a request through a network protocol, the URN comprising a public key and a representation of the request, wherein the request comprises Hypertext Transfer Protocol (HTTP) basic authentication (basic auth) and at least one of a PUT operation or a GET operation, the network protocol is HTTP, and the representation of the request is stored as metadata of the URN;
computing, using a public-key signature algorithm, a signature based on the URN using a private key associated with the public key;
generating a signed URN comprising the URN and the signature; and
causing storing of the signed URN.

2. The computer-implemented method of claim 1, wherein the PUT operation is a corresponding PUT operation for content data, the signature is computed further based on the content data, and the content data is stored with the signed URN.

3. The computer-implemented method of claim 2, wherein computing the signature further comprises:
hashing the content data as hashed content data; and
computing, through the public-key signature algorithm, the signature based on the URN and the hashed content data using the private key associated with the public key.

4. The computer-implemented method of claim 2, wherein the URN further comprises a path for the content data.

5. The computer-implemented method of claim 1, the metadata of the URN further comprising at least one of an expiration timestamp and a different signed URN.

6. The computer-implemented method of claim 1, wherein the signed URN is verified before storing the signed URN.

7. The computer-implemented method of claim 1, wherein an amount based on a length of content data associated with the signed URN is deducted from a wallet associated with the public key before storage of the signed URN.

8. The computer-implemented method of claim 7, wherein the amount deducted is further based on an expiration of the signed URN.

9. One or more non-transitory computer-readable media having a plurality of executable instructions embodied thereon, which, when executed by one or more processors, cause the one or more processors to perform a method comprising:
generating a request to store content data through a network protocol, wherein the request comprises Hypertext Transfer Protocol (HTTP) basic authentication (basic auth) and a PUT operation and the network protocol is HTTP, generating the request by:
generating a uniform resource name (URN) for the request, the URN comprising a public key and a representation of the request, the representation of the request stored as metadata of the URN;
computing, through a public-key signature algorithm, a signature based on the URN and the content data using a private key associated with the public key; and
generating a signed URN comprising the URN and the signature; and
causing storing of the content data with the signed URN.

10. The one or more non-transitory computer-readable media of claim 9, wherein computing the signature further comprises:
hashing the content data as hashed content data; and
computing, through the public-key signature algorithm, the signature based on the URN and the hashed content data using the private key associated with the public key.

11. The one or more non-transitory computer-readable media of claim 9, wherein the URN further comprises a path for the content data.

12. The one or more non-transitory computer-readable media of claim 9, the metadata of the URN further comprising at least one of an expiration timestamp and a different signed URN.

13. The one or more non-transitory computer-readable media of claim 9, wherein the signed URN is verified before storing the content data with the signed URN.

14. The one or more non-transitory computer-readable media of claim 9, wherein an amount based on a length of the content data is deducted from a wallet associated with the public key before storage of the content data with the signed URN.

15. The one or more non-transitory computer-readable media of claim 14, wherein the amount deducted is further based on an expiration of the signed URN.

16. A computing system comprising:
a processor; and
a non-transitory computer-readable medium having stored thereon instructions that when executed by the processor, cause the processor to perform operations including:
receiving a signed uniform resource name (URN) and data through a network protocol, the signed URN comprising a URN and a signature based on the URN and the data, the URN comprising metadata corresponding to a request to store data, wherein the request comprises Hypertext Transfer Protocol (HTTP) basic authentication (basic auth) and a PUT operation and the network protocol is HTTP;
verifying the signed URN based on the signature and the data; and
causing storing of the data with the signed URN.

17. The system of claim 16, wherein the instructions that when executed by the processor, cause the processor to perform the operations further including:
deducting an amount based on a length of the data from a wallet associated with a public key of the request.

18. The system of claim 16, wherein the instructions that when executed by the processor, cause the processor to perform the operations further including:

generating a response through the network protocol in response to the request to store the data by: 5 generating a corresponding URN for the response, the URN for the response comprising a public key for a server and corresponding metadata corresponding to the response;

computing, through a public-key signature algorithm, a 10 corresponding signature for the response based on the corresponding URN for the response using a private key associated with the public key of the server;

generating a corresponding signed URN for the response comprising the corresponding URN for the response 15 and the corresponding signature for the response; and causing storing of the corresponding signed URN.

\* \* \* \* \*